236. AUTOMATIC TEMPERATURE & HUMIDITY REGULATION.
16
T. T. TASKER.
REGULATING THE FURNACE OF HOT WATER APPARATUS.
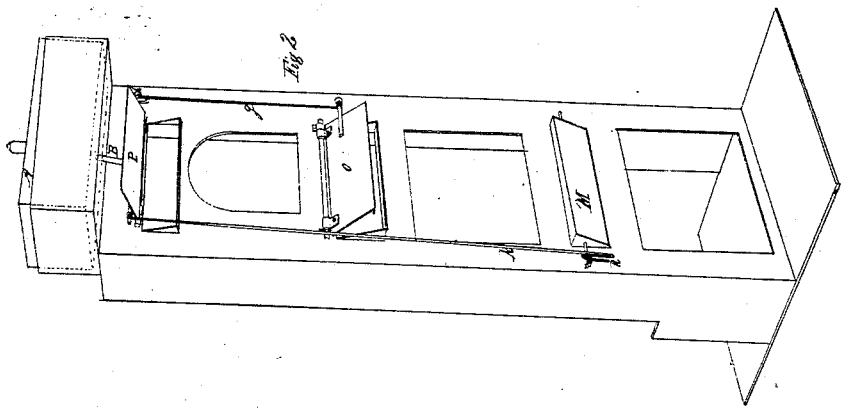
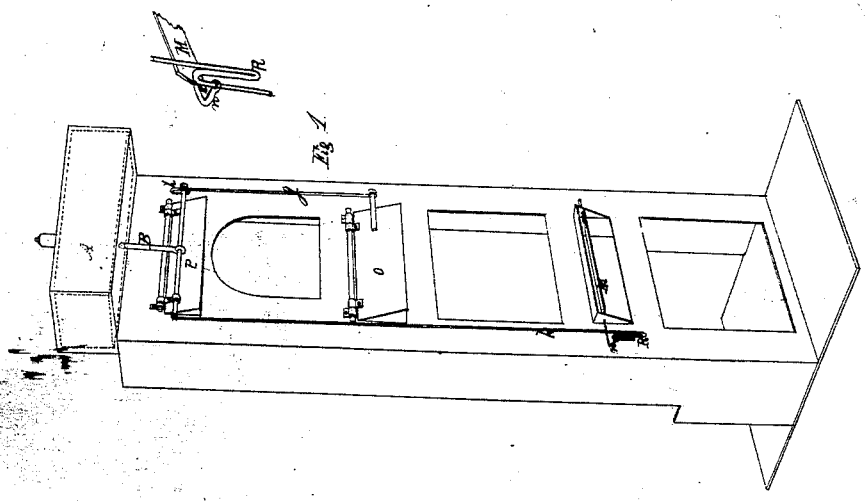
No. 122. A. I. Patented May 8, 1855.